United States Patent
Eidmann et al.

(10) Patent No.: US 10,384,727 B2
(45) Date of Patent: Aug. 20, 2019

(54) METHOD FOR PRODUCING A NODE STRUCTURE WITH AT LEAST TWO PROFILE COMPONENTS AND NODE STRUCTURE AND VEHICLE BODY

(71) Applicant: Audi AG, Ingolstadt (DE)

(72) Inventors: Florian Eidmann, Öhringen (DE);
Oliver Schauerte, Bad Wimpfen (DE);
Karl Durst, Bergen (DE)

(73) Assignee: Audi AG, Ingolstadt (DE)

( * ) Notice: Subject to any disclaimer, the term of this patent is extended or adjusted under 35 U.S.C. 154(b) by 341 days.

(21) Appl. No.: 15/330,821

(22) Filed: Nov. 7, 2016

(65) Prior Publication Data
US 2017/0158253 A1   Jun. 8, 2017

(30) Foreign Application Priority Data
Nov. 6, 2015   (DE) .................... 10 2015 014 358

(51) Int. Cl.
| | |
|---|---|
| *B62D 29/04* | (2006.01) |
| *B62D 27/02* | (2006.01) |
| *B29C 65/48* | (2006.01) |
| *B29C 65/56* | (2006.01) |
| *B29L 31/30* | (2006.01) |

(52) U.S. Cl.
CPC ............ *B62D 29/048* (2013.01); *B29C 65/48* (2013.01); *B29C 65/56* (2013.01); *B62D 27/023* (2013.01); *B62D 27/026* (2013.01); *B62D 29/041* (2013.01); *B62D 29/046* (2013.01); *B29L 2031/30* (2013.01)

(58) Field of Classification Search
CPC ........................... B62D 29/048; B62D 27/023
See application file for complete search history.

(56) References Cited

U.S. PATENT DOCUMENTS

| | | | |
|---|---|---|---|
| 2003/0152745 A1* | 8/2003 | Wagenblast | B29C 45/14467 |
| | | | 428/119 |
| 2014/0300126 A1* | 10/2014 | Ehrlich | B62D 27/02 |
| | | | 296/29 |

(Continued)

FOREIGN PATENT DOCUMENTS

| | | |
|---|---|---|
| CN | 103702894 A | 4/2014 |
| DE | 44 23 642 C1 | 10/1995 |

(Continued)

OTHER PUBLICATIONS

Chinese Search Report dated Aug. 2, 2018 with respect to counterpart Chinese patent application 2016109609264.

(Continued)

*Primary Examiner* — Hilary L Gutman
(74) *Attorney, Agent, or Firm* — Henry M. Feiereisen LLC

(57) ABSTRACT

A method for producing a node structure includes providing at least two pre-manufactured profile components having respective profile ends provided with corresponding abutment surfaces; positioning the profile ends in a pressing tool so that a homogenous gap is formed between the abutment surfaces; performing a pressing process in the presence of a fiber-containing plastic mass in the pressing tool for generating a connecting node that form fittingly connects the profile ends, wherein the fiber containing plastic mass also enters into the gap.

12 Claims, 3 Drawing Sheets

(56) References Cited

U.S. PATENT DOCUMENTS

| | | | |
|---|---|---|---|
| 2015/0283756 A1* | 10/2015 | Flaig ................... | B29C 70/462 |
| | | | 428/34.1 |
| 2016/0016229 A1* | 1/2016 | Czinger ............... | B22F 3/1055 |
| | | | 296/205 |
| 2016/0280285 A1* | 9/2016 | Steber ................. | B62D 23/005 |
| 2017/0129545 A1* | 5/2017 | Schauerte ........... | B62D 27/023 |

FOREIGN PATENT DOCUMENTS

| | | | | |
|---|---|---|---|---|
| DE | 10 2005 061474 A1 | 7/2007 | | |
| DE | 102010033289 A1 * | 2/2012 | ........... | B62D 23/005 |
| DE | 102010054935 A1 * | 6/2012 | ............. | B29C 70/48 |
| DE | 10 2011 107212 A1 | 1/2013 | | |
| DE | 10 2012 112313 A1 | 6/2014 | | |
| DE | 10 2013 220209 A1 | 4/2015 | | |
| DE | 102013225909 A1 * | 6/2015 | ........... | B62D 23/005 |
| DE | 102014207565 A1 | 10/2015 | | |
| EP | 3165429 A1 * | 5/2017 | ........... | B62D 27/023 |
| WO | WO 02/2292 A1 | 1/2002 | | |
| WO | WO 2012/062391 A1 | 5/2012 | | |
| WO | WO 2013066172 A1 | 5/2013 | | |

OTHER PUBLICATIONS

Translation of Chinese Search Report dated Aug. 2, 2018 with respect to counterpart Chinese patent application 2016109609264.
European Search Report with respect to counterpart European patent application EP 16 00 2247, dated Mar. 9, 2017.
English translation of European Search Report with respect to counterpart European patent application EP 16 00 2247, dated Mar. 9, 2017.

* cited by examiner a b c

METHOD FOR PRODUCING A NODE STRUCTURE WITH AT LEAST TWO PROFILE COMPONENTS AND NODE STRUCTURE AND VEHICLE BODY

CROSS-REFERENCES TO RELATED APPLICATIONS

This application claims the priority of German Patent Application, Serial No. 10 2015 014 358.1, filed Nov. 6, 2015, pursuant to 35 U.S.C. 119(a)-(d), the content of which is incorporated herein by reference in its entirety as if fully set forth herein.

BACKGROUND OF THE INVENTION

The invention relates to a method for producing a node structure with at least two profile components that are in particular made of a fiber reinforced plastic composite material.

The following discussion of related art is provided to assist the reader in understanding the advantages of the invention, and is not to be construed as an admission that this related art is prior art to this invention.

Vehicle body structures formed from profiles are known from the state of the art. Thus for example DE 44 23 642 C1 discloses a motor vehicle support frame which is composed of individual separately pre-manufactured frame profile components. The frame profile components can each be configured as fiber composite profile pieces, for example with a rectangular hollow profile cross section and in the consolidated or cured state are respectively connected framework-like via node pieces, which are also made of a fiber composite material, to form an integral frame structure. For manufacture of a node piece, the frame profile components that are to be connected are inserted into the receiving pockets of a pre-manufactured fiber preform. In a forming tool, the node piece is then generated under the influence of pressure and heat.

It would be desirable and advantageous to provide an improved method for producing a node structure.

SUMMARY OF THE INVENTION

According to one aspect of the present invention a method for producing a node structure includes providing at least two pre-manufactured profile components having respective profile ends provided with corresponding abutment surfaces; positioning the profile ends in a pressing tool so that a homogenous gap is formed between the abutment surfaces; performing a pressing process in the presence of a fiber-containing plastic mass in the pressing tool for generating a connecting node that form fittingly connects the profile ends, wherein the fiber containing plastic mass also enters into the gap.

A further independent patent claim sets forth a vehicle body, in particular for a passenger car with a frame (space frame) that is constructed from profile components and with at least one node structure according to the invention. Preferably multiple profile components that form a frame section (for example the rear section front section or mid-section structure) are made of fiber plastic composite material. These are in particular exclusively hollow profile components, which are connected with each other by means of node structures according to the invention.

The profile ends of the profile components to be connected in a connecting node are configured with corresponding abutment surfaces, which means surface areas that face each other or confront each other in the connecting node and which in case of stress also serve as force transmission surfaces. The corresponding abutment surfaces can for example be configured as straight slanted surfaces, as concave and convex surfaces (or at least having concave or convex surface portions), as waved surfaces, as stepped surfaces and/or as surfaces that can be nested in each other, which is the subject matter of advantageous refinements.

The gap between these abutment surfaces makes it possible that during the pressing process the fiber containing plastic mass, which is used for generating the connecting node, is also pressed between these abutment surfaces so that the node-side profile ends are optimally surrounded by the fiber containing plastic mass and thereby are integrated in a form fitting or also materially bonding manner. A homogenous or uniform gap ensures that the fiber containing plastic mass can fully fill the gap and that at any point of the gap substantially the same connecting properties are generated. A non uniform gap may for example lead to an asymmetric force flux in the event of stress on the produced node structure.

The invention has many advantages. For example, in the method according to the invention no pre-manufactured fiber preform, such as described in DE 44 23 642 C1, is required. Furthermore, a node structure produced with the method according to the invention has excellent strength, stiffness, and crash stability, while also being lightweight.

According to another advantageous feature of the invention the gap has a substantially constant width of at least 0.5 mm and at most 2.0 mm. The minimal gap width of at least 0.5 mm ensures a distance between the abutment surfaces that permits flow so that the profile ends positioned in the pressing tool can be ideally surrounded by the fiber containing plastic mass and thereby integrated in a form fitting/materially bonding manner. The maximal gap width of at most 2.0 mm ensures that in the produced connecting node the paths of force flux between the connected profile ends and their abutment surfaces are short.

After the curing of the fiber containing plastic mass the pressing tool can be opened and the produced node structure removed. This node structure includes at least two profile components, in particular made of fiber plastic composite material, and a connecting node made of fiber plastic composite material or fiber containing plastic mass, and in particular short fiber containing plastic mass, in which the profile components are connected with each other at their profile ends (or at their node side profile ends in a form fitting and optionally materially bonding manner, wherein the profile ends connected in the connecting node are configured with corresponding abutment surfaces and these abutment surfaces are spaced apart from each other by a uniform gap (i.e. with substantially constant gap width) that is filled with fiber containing plastic mass. The node structure is thus an assembly made of at least two profile components.

The term profile component means a longitudinal rod-like component with a defined cross sectional shape (profile), which can have a straight or also curved or bent axial extent. At least one profile component can also be a tubular hollow profile component with a closed cross section and with at least one profile chamber. The corresponding profile and hollow profile components are in particular made of consolidated fiber plastic composite material. The fibers can be carbon fibers, glass fibers and/or other fibers. Preferably they are long fibers, which are, for example also in a layered construction, arranged in accordance with a load path. The plastic material (matrix material) can be a thermoset or thermoplastic.

The profile components can be pre-manufactured components, which are produced in a prior manufacturing process, optionally also by a supplier. The provision of these components includes for example confectioning, preparation, cleaning and/or testing of the profile components to be connected. The provision includes optionally also production of the abutment surfaces for example by mechanical processing, in particular by cutting and/or milling, wherein the abutment surfaces have to be produced at the lasted prior to insertion and positioning of the profile ends in the pressing tool.

According to another advantageous feature of the invention, the profile components are produced from pre-manufactured profile semi-finished products (in particular rod products). It is also conceivable however to directly produce the profiles or profile components for example by pultusion (or optionally also by coiling or braiding). The profile components can be made of the same fiber reinforced plastic composite material or of different fiber reinforced plastic composite materials.

According to another advantageous feature of the invention, at least one profile component of a node structure according to the invention is a hollow profile component made of fiber reinforced plastic composite material. In particular all profile component of a node structure according to the invention are hollow profile components made of fiber reinforced plastic composite material.

The plastic mass that generates the connecting node can be a thermoset (resin) or a thermoplast. The fibers can preferably be short fibers (carbon fibers, glass fibers and/or other fibers, also mixed fibers and in particular recycled fibers) with a length of for example 1 mm to 100 mm, preferably 2 mm to 50 mm, and in particular 3 mm to 25 mm. Preferably the fiber-containing plastic mass used for generating the connecting node is adjusted to the fiber reinforced plastic composite material of the profile components or hollow profile components to be connected.

The fiber-containing plastic mass for generating the connecting node can be introduced into the tool cavity prior to closing the pressing tool. The fiber-containing plastic mass for generating the connecting node can also be introduced into the tool cavity after closing the pressing tool by injection (similar to injection molding of the RTM technology).

As described above at least one of the profile components can be a hollow profile component, wherein in particular it is provided that the node-side open profile end of this hollow profile component is closed by means of a closing element in order to prevent the fiber containing plastic mass from entering the hollow profile component during the pressing process. The closing element that is to be applied at the latest prior to inserting and positioning of the hollow profile component in the pressing tool is for example a cover, in particular made of fiber plastic composite material, or a stopper-like closing element made of a plastic foam material, which is in particular glued into the open profile end.

According to another advantageous feature of the invention, the profile components and/or hollow profile components to be connected in a connecting node can have different cross sections or cross sectional dimensions and/or different wall thicknesses or wall strengths at least at their profile ends that are to be connected or at their node-side end sections.

According to another aspect of the invention a node structure for a vehicle body, includes at least two profile components having respective profile ends configured with respective corresponding joining surfaces; and a connecting node in which the profile components are form fittingly connected with each other at the respective profile ends, said respective profile ends being spaced apart from each other by a homogenous gap which is filled with a fiber-containing plastic mass.

The node structure can be manufactured with the method according to the invention.

According to another aspect of the invention a vehicle body, includes a frame, wherein the frame includes profile components having respective profile ends configured with respective corresponding joining surfaces, and a connecting node in which the profile components are form fittingly connected with each other at the respective profile ends, wherein the respective profile ends are spaced apart from each other by a homogenous gap which is filled with a fiber-containing plastic mass.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
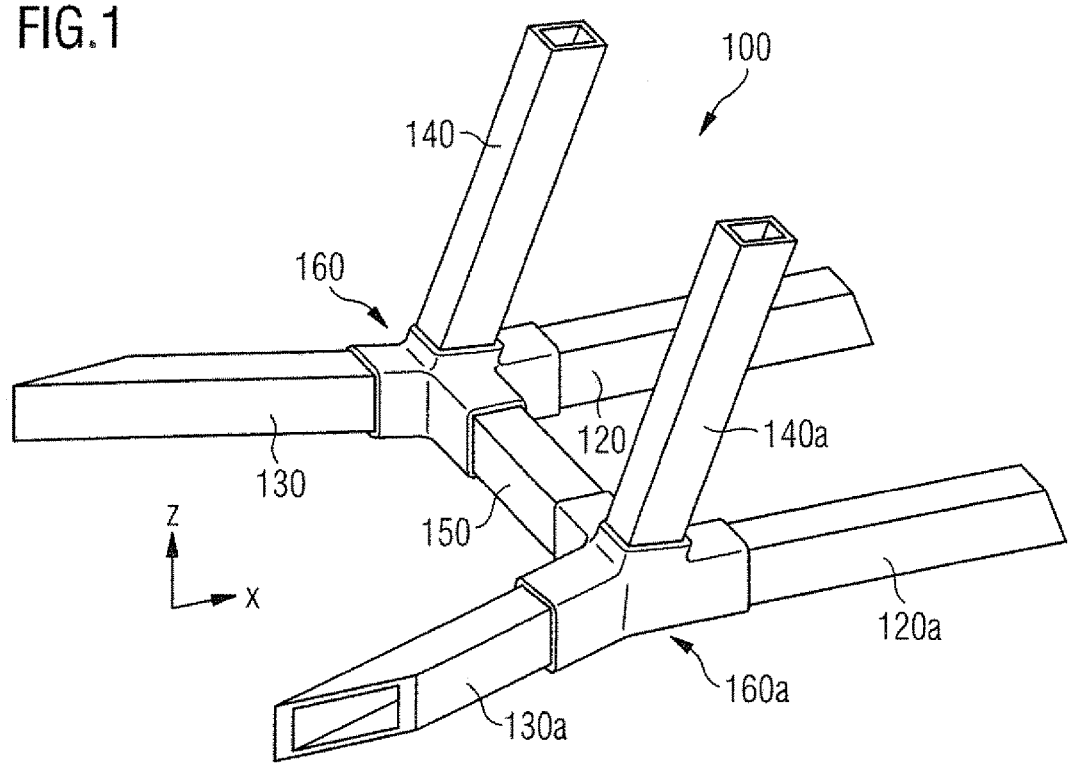
FIG. 1 shows in a perspective view a vehicle rear section structure made of hollow profile components.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

The vehicle structure or vehicle rear section structure 100 show in FIG. 1 is a part of a frame of a vehicle body. The vehicle rear section structure 100 includes multiple separately pre manufactured hollow profile components 120, 120*a*, 130, 130*a*, 140, 140*a* and 150 made of fiber plastic composite material, wherein these are so called pultrusion profiles whose profile ends are fixedly connected with each other on connecting nodes or node sites 160 and 160*a*. Typically, the hollow profile components 120, 120*a*, 130, 130*a*, 140, 140*a*, and 150 are configured differently, i.e., they have depending on the stress different cross sections and/or wall thicknesses and/or are made of different fiber plastic composite materials. The vehicle rear section structure 100 can also have closed profile components and/or profile components that are made of other materials (for example also metal), and which are in particular also integrated in the frame structure 100 via the connecting nodes 160 or 160*a*. In spite of its low weight, the vehicle rear section structure 100 nevertheless has excellent strength, stiffness and crash stability.

Figure 2:
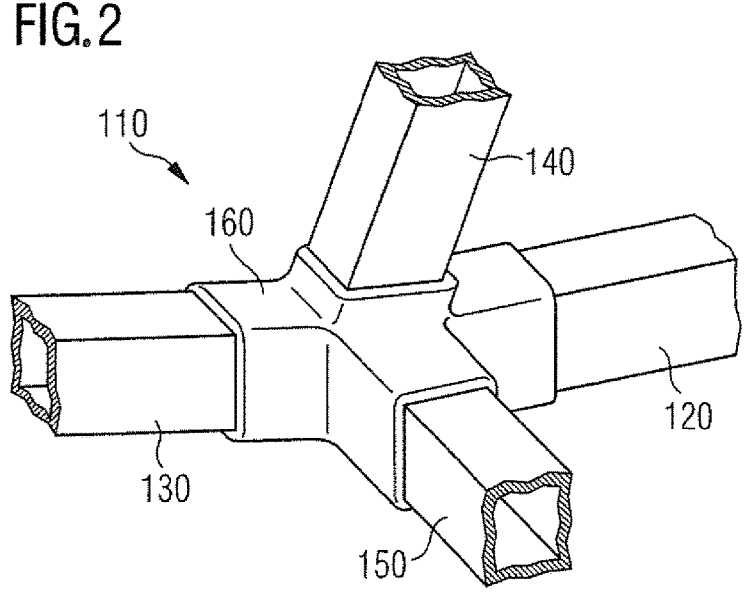
FIG. 2 shows a perspective view of a node structure belonging to the vehicle rear section structure of FIG. 1.

The hollow profile components that are connected in a connecting node 160 or 160*a* form together with this connecting node a node structure in the sense of the invention. FIG. 2 shows such a node structure 110 for the frame region that is positioned in driving direction x on the left-hand side. The integrated node structure 110 includes multiple hollow profile components 120, 130, 140, and 150 whose profile ends are fixedly connected with each other in a connecting node 160.

In the following the production of such a node structure 110 is explained in more detail with reference to FIGS. 3, 4 and 5, wherein only the connection between the two hollow profile components 120 and 130 is explained. While not illustrated, the hollow profile components 120 and 130 can have different cross sections or cross sectional dimensions and/or different wall thicknesses or wall strengths at least at their end sections 121 and 131 that are to be connected.

According to the invention the node-side profile ends to be connected are configured with corresponding abutment surfaces. FIGS. 3A-D show the profile ends 121 and 131 of the hollow profile components 120 and 130 with differently configured abutment surfaces 122 and 132. The open profile ends 121 and 131 of the hollow profile components 120 and 130 to be connected are closed by closing elements 125 and 135 that are glued in by adhesive 126 or 136. The closing elements 125 and 135 are made of a plastic foam material, in particular a temperature resistant and pressure resistant hard foam. The abutment surfaces 122 and 132 are preferably only generated after these closing elements 125 and 135 have been glued in, wherein the processing is in particular performed by mechanical processing such as cutting and/or milling. This process can also be referred to as contouring of the profile ends.

Figure 3A:
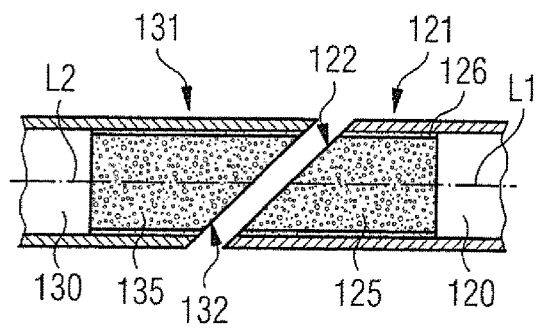
FIG. 3A shows a sectional view of a possible configuration of an abutment surface on two hollow profile components to be connected during the production of the node structure of FIG. 2.
Figure 3B:
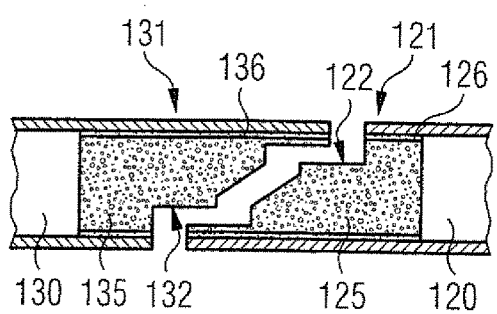
FIG. 3B shows a section al view of another possible configuration of an abutment surface on two hollow profile components to be connected during the production of the node structure of FIG. 2.
Figure 3C:
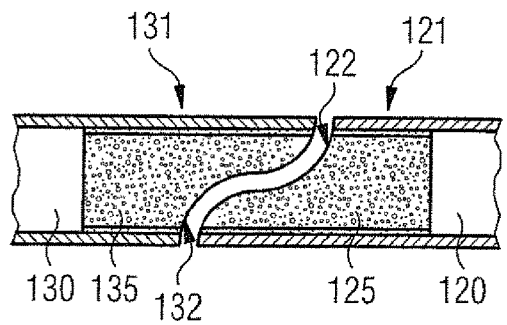
FIG. 3C shows a section al view of another possible configuration of an abutment surface on two hollow profile components to be connected during the production of the node structure of FIG. 2.
Figure 3D:
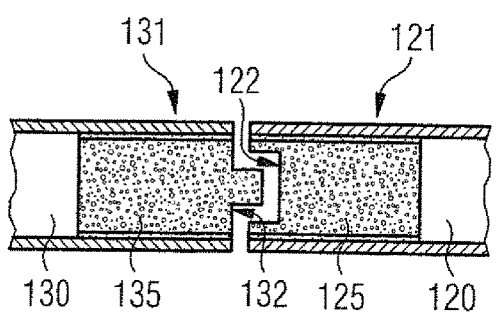
FIG. 3D shows a section al view of another possible configuration of an abutment surface on two hollow profile components to be connected during the production of the node structure of FIG. 2.

In the embodiment shown in FIG. 3A the node-side profile ends are slanted, i.e., the abutment surfaces 122 and 132 on the profile ends 121 and 131 are configured as straight slanted surfaces. The node-side slanted surfaces 122 and 132 extend slanted (in the sense of non-perpendicular) relative to the longitudinal axes L1 and L2 of the hollow profile components 120 and 130. In the embodiment shown in FIG. 3B the abutment surfaces 122 and 132 are configured as oppositely stepped surfaces. In the embodiment shown in FIG. 3C the abutment surfaces 122 and 132 are configured as waved surfaces with corresponding wave contours (which have concave and convex surface portions). In the embodiment shown in FIG. 3D the abutment surfaces 122 and 132 are configured as surfaces that can be nested in each other.

FIGS. 3A-D show the corresponding abutment surfaces 122 and 132 on the profile ends 121 and 131 to be connected only schematically in 2D representations. Of course the shown abutment surfaces 12 and 132 have correspondingly configured three-dimensional surface contours. Furthermore the embodiments for abutment surfaces shown in FIGS. 3A-D can be changed or combined to form further embodiments.

The corresponding abutment surfaces 122 and 132 shown in FIGS. 3A-D are configured so that they can be arranged with a homogenous gap between them (see FIGS. 4 and 5), as explained in more detail below. The abutment surfaces 122 and 132 can be configured so as to enable improved force and/or torque transmission between the associated profile components 120 and 130 in spite of the presence of the gap.

Figure 4:
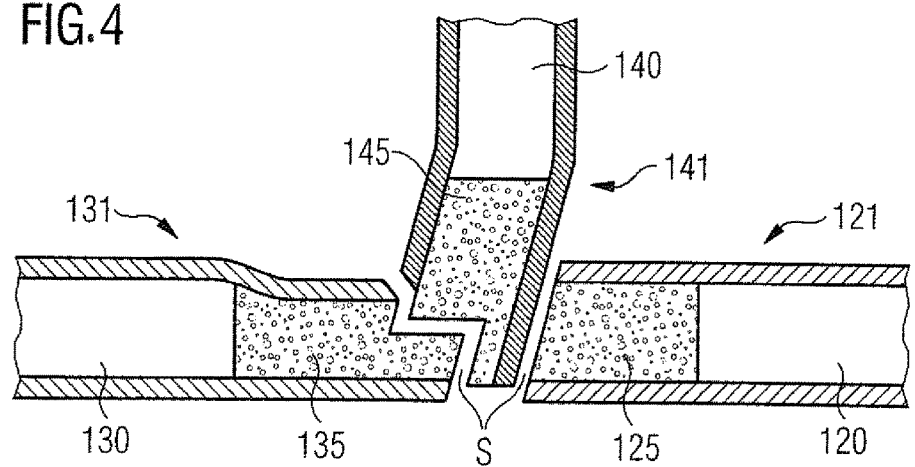
FIG. 4 shows a sectional view of possible configurations of abutment surfaces of three hollow profile components to be connected during the production of the node structure of FIG. 2.
Figure 5:
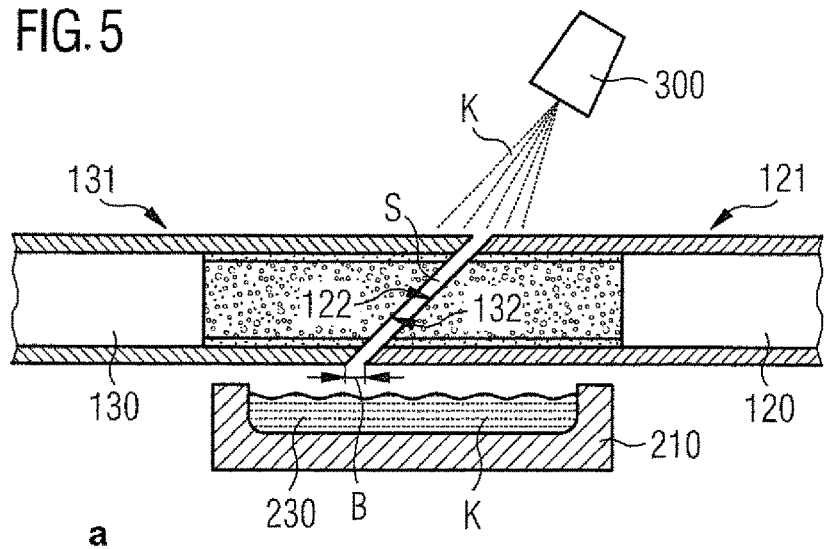
FIG. 5 shows in sectional view steps of the production of connecting nodes during the production of the node structure of FIG. 2.
Figure 5:
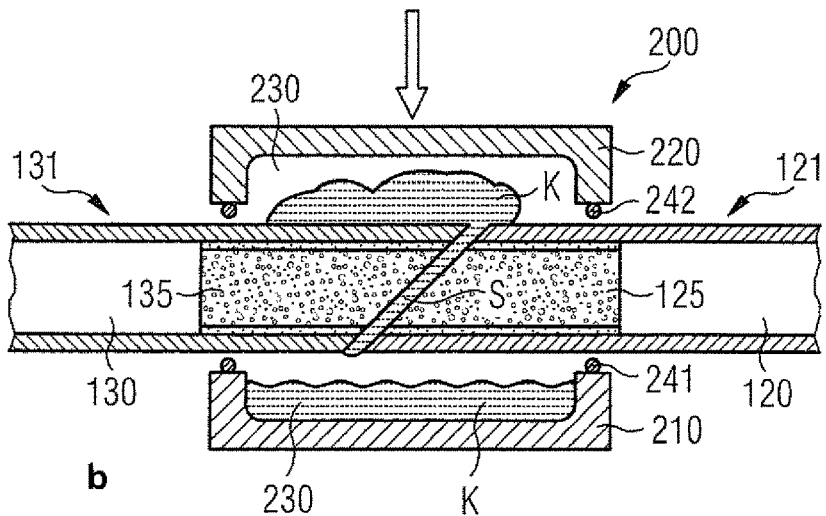
Figure 5:
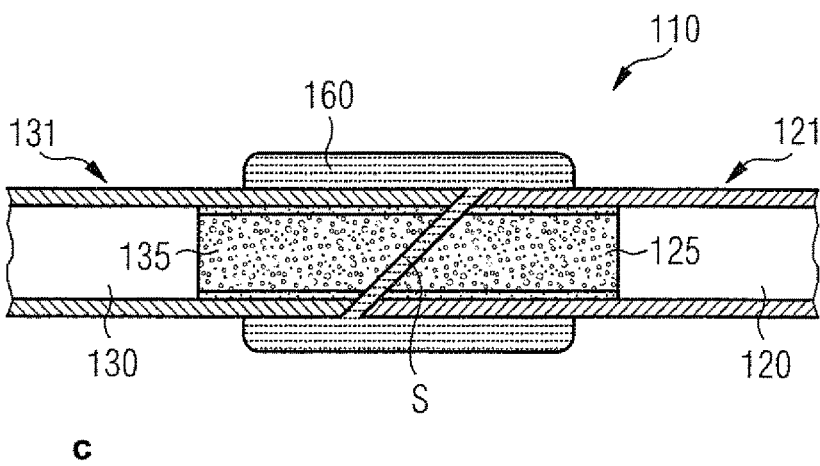

FIG. 4 shows an embodiment with complexly formed abutment surfaces for three profile ends 121, 131 and 141 that are to be connected in the connecting node 160. The corresponding profile ends 121, 131 and 141 are prepared by mechanical processing, which results in specially formed abutment surfaces or joining surfaces, i.e., corresponding end shapes. The contouring is in particular carried out so that these profile ends 121, 131 and 141 can be positioned as close as possible to each other while maintaining homogenous gaps S with greatest possible abutment surfaces. Thus within a connecting node multiple abutment surface pairings that are configured with different surface contours and/or with different gap widths can be provided. In this way also more than two profile ends, or even up to five profile ends and more can be brought in very close proximity to each other in a connecting node which saves space while taking later load paths into account.

For generating the connecting node 160 the closed profile ends 121 and 131 of the hollow profile components 120 and 130, which are configured with corresponding abutment surfaces 122 and 132, are inserted into a pressing tool 200 that generates the connecting node 160 as shown in FIG. 5*a*. Correspondingly configuring the two-part pressing tool 200 makes it possible to also realize different connecting angles than the shown 180° connecting angle. The pressing tool 200 is configured to enable accurately fixing the profile ends 121 and 131 in position. The abutment surfaces 122 and 132 of the profile ends 121 and 131 to be connected are spaced apart by a homogenous or uniform gap S. The size of the gap or the gap width B is for example 0.25 mm to 3 mm and in particular 0.5 mm to 2.0 mm.

In the tool cavity 230 of the lower tool 210 a short-fiber-containing plastic mass K is present which was introduced already prior to inserting and positioning the profile ends 121 and 131. The plastic mass K is preferably a thermoset mass (resin). After the positioning of the profile ends 121 and 131 that are to be connected additional short-fiber-containing plastic mass K is applied or sprayed onto the connecting region, for example with the shown spray device 300.

Subsequently the pressing tool 200 is closed by lowering the upper tool 220 as shown in FIG. 5*b* and a pressing process is performed. During this pressing process the defined amount of fiber-containing plastic mass K is distributed in the cavity 230, wherein the profile ends 121 and 131 of the hollow profile components 120 and 130 arranged in the cavity 230 are surrounded form fittingly and wherein the fiber-containing plastic mass K is also pressed into the gap S. Hereby also a materially bonding connection between the plastic mass K, which forms the connecting nodes 160, and the profile ends 121 and 131 is formed. The shape of the connecting node 160 is defined by the negative form of the tool cavity 230.

During the pressing process the closing elements 125 and 135 act as barriers and prevent the fiber-containing plastic mass K from entering the profile chambers of the hollow profile components 120 and 130. This also allows establishing a high defined forming pressure in the tool cavity 230.

During production of the connecting node 160 only the profile ends 121 and 131 that are to be connected are inserted into the pressing tool 200, so that the hollow profile components 120 and 130 protrude into the tool cavity 230 through openings in the pressing tool 200. The pressing tool 200 is configured so as to enable accurately fixing the profile ends 121 and 131 in position. During the pressing process the sealing of the pressing tool 200 is accomplished by way of sealings 241 and 242. The pressure-resistant closing elements 125 and 135 can stabilize the hollow profile walls in the sealing region and improve the sealing of the cavity.

After the preferably thermoset plastic mass K is cured as a result of pressure and temperature the pressing tool 200 can be opened and the produced node structure 110 can be removed as shown in FIG. 5c. The connecting node 160 can have wall thicknesses in the range from 1 mm to 15 mm, wherein the same but also different wall thicknesses can be provided. The closing elements 125 and 135 improve the strength, stiffness and crash stability of the node structure without noticeably adding weight.

The short-fiber-containing plastic mass K can be pre-mixed and can be introduced into the tool cavity 230 prior to closing the pressing tool 200, for example by means of the spray device 300 or the like. Furthermore a layered introduction is possible, wherein alternately fiber layers and plastic layers (resin layers) can be introduced. The short-fiber plastic mass K can also be introduced into the tool cavity 230 by injection after closing the pressing tool 200 (injection molding).

What is claimed is:

1. A method for producing a node structure,
said method comprising:
providing at least two pre-manufactured profile components having respective profile ends provided with corresponding abutment surfaces;
positioning the profile ends in a pressing tool so that between the abutment surfaces a homogenous gap having a substantially constant gap width is formed;
performing a pressing process in the presence of a fiber-containing plastic mass in the pressing tool for generating a connecting node that form fittingly connects the respective profile ends, wherein the fiber-containing plastic mass enters into the gap and forms an exterior surface of the connecting node, wherein the substantially constant gap width of the homogenous gap is between 0.5 mm and 2.0 mm.

2. The method of claim 1, wherein the at least two pre-manufactured profile components in are made of a fiber reinforced plastic composite material.

3. The method of claim 1, wherein the abutment surfaces are configured as straight slanted surfaces.

4. The method of claim 1, wherein the abutment surfaces are configured as concave and convex surfaces.

5. The method of claim 1, wherein the abutment surfaces are configured as stepped surfaces.

6. The method of to claim 1, wherein the abutment surfaces are configured as surfaces that can be nested in each other.

7. The method of claim 1, wherein at least one of the profile components is a hollow profile component having an open end, said method further comprising closing the open end with a closing element which during the pressing process prevents the fiber-containing plastic mass from entering the hollow profile component.

8. The method of claim 1, wherein at least two of the profile components that are to be connected with each other in the connecting node have different cross sections.

9. A node structure for a vehicle body, said node structure comprising:
at least two profile components having respective profile ends configured with respective corresponding joining surfaces; and
a connecting node in which the profile components are form fittingly connected with each other at the respective profile ends, said respective profile ends being spaced apart from each other by a homogenous gap having a substantially constant gap width which is filled with a fiber-containing plastic mass that also forms an exterior surface of the connecting node, wherein the substantially constant gap width of the homogenous gap is between 0.5 mm and 2.0 mm.

10. The node structure of claim 9, wherein the at least two profile components are made of a fiber reinforced plastic composite material.

11. A vehicle body, comprising:
a frame, said frame comprising
profile components having respective profile ends configured with respective corresponding joining surfaces, and
a connecting node in which the profile components are form fittingly connected with each other at the respective profile ends, said respective profile ends being spaced apart from each other by a homogenous gap having a substantially constant gap width which is filled with a fiber-containing plastic mass that also forms an exterior surface of the connecting node, wherein the substantially constant gap width of the homogenous gap is between 0.5 mm and 2.0 mm.

12. The vehicle body of claim 11 for use in a passenger car.

* * * * *